Jan. 9, 1968
C. M. HOPPER
3,362,458
HEAT EXCHANGE METHOD IN CRYSTALLIZATION
Filed June 21, 1965
2 Sheets-Sheet 1
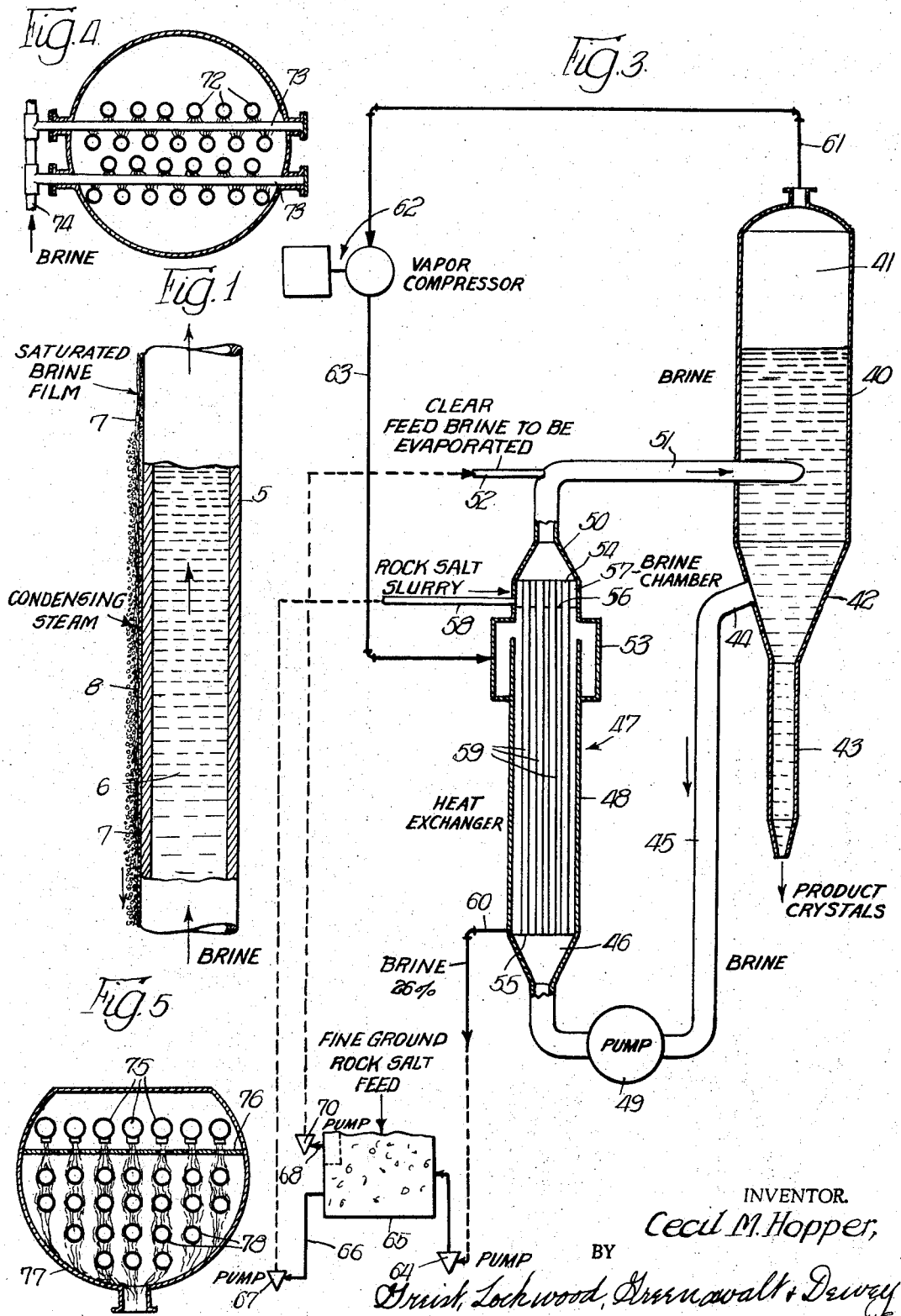
INVENTOR.
Cecil M. Hopper,
BY
Drinh, Lockwood, Greenawalt & Dewey
attys

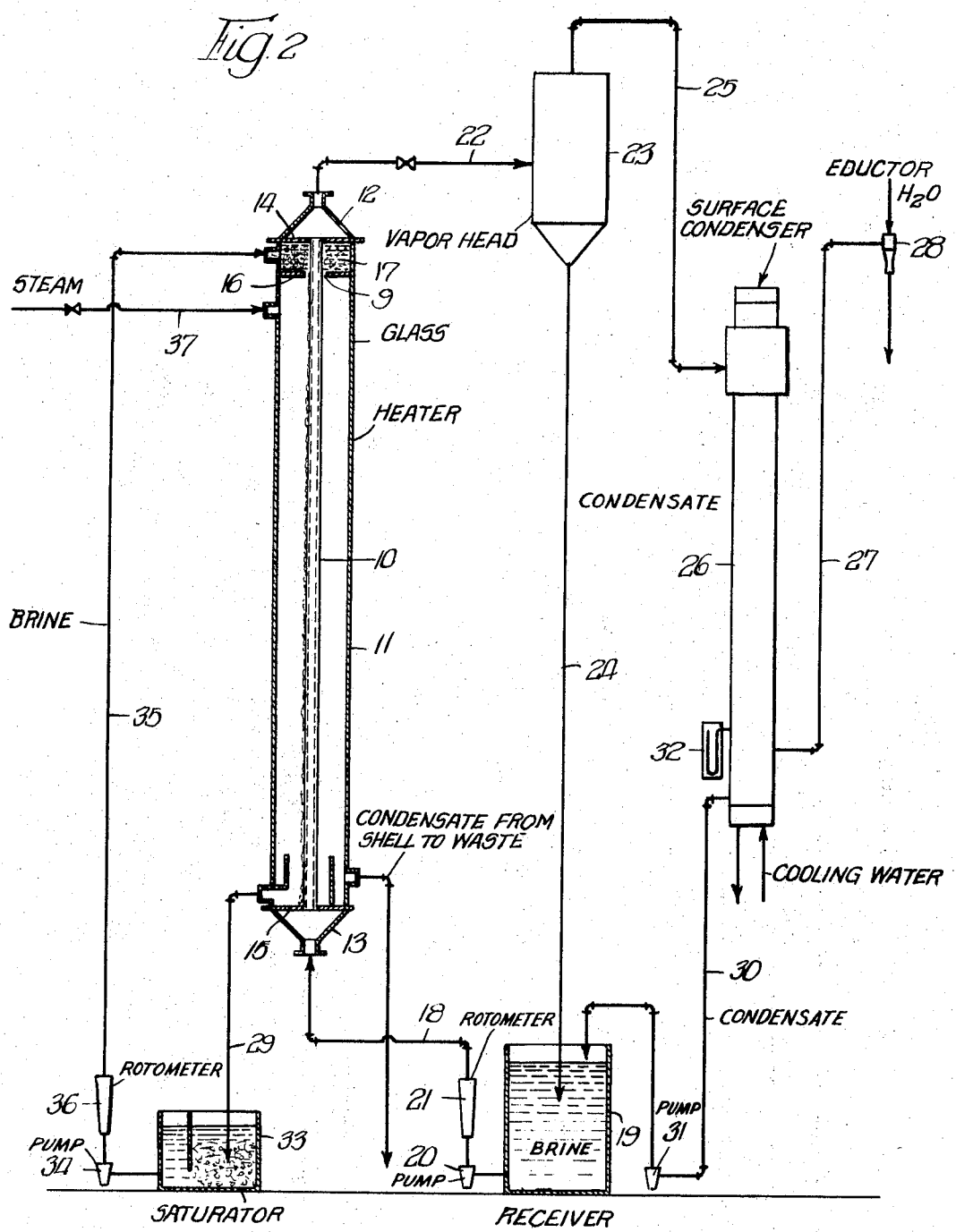

United States Patent Office 3,362,458
Patented Jan. 9, 1968

3,362,458
HEAT EXCHANGE METHOD IN CRYSTALLIZATION
Cecil M. Hopper, Lake Forest, Ill., assignor to Whiting Corporation, a corporation of Illinois
Filed June 21, 1965, Ser. No. 465,679
7 Claims. (Cl. 159—49)

The present invention relates to certain innovations and improvements in heat exchange method and apparatus for evaporating and other systems. More particularly, the invention relates to increasing heat exchange efficiency by making unique use of the principle or phenomenon that the vapor pressure of water at its boiling point is substantially greater than the vapor pressure of a brine (or other electrolyte) solution at the same temperature, particularly a concentrated or unsaturated brine solution. Because of this difference in vapor pressures, saturated steam at a temperature of 212° F. and 14.7 p.s.i.a. (atmospheric, sea level), for example, will condense in, impart its heat of condensation to, and raise the temperature of, a saturated solution of brine (NaCl) by an amount equal to the boiling point elevation of such brine, i.e., to a temperature of 227° F.

The lowering of vapor pressure by salts or electrolytes in aqueous solutions is, in itself, known and accurate determinations have been made of this phenomenon and data thereon are published in the technical literature. This lowering of vapor pressure by salts or electrolytes is not peculiar to any particular salt as published tables bring out. In addition to salts the same effect is observable and obtained with other electrolytes such as bases (e.g. sodium hydroxide and potassium hydroxide) and acids (e.g. sulfuric acid). Since common salt (sodium chloride) is, in general, more widely available and has greater commercial importance than most other salts, the present invention appears to have particular utility in connection therewith. However, the same principles that apply to sodium chloride also apply to other salts and electrolytes as mentioned.

The basic underlying principle of the present invention can be demonstrated experimentally by taking an enclosed body of brine and heating it to a temperature of 212° F. at atmospheric pressure. If the brine is saturated (i.e. contains approximately 28% salt) it will not boil since the vapor pressure of the brine solution will be 176.5 millimeters less than the vapor pressure of water at its boiling point of 212° F. If steam at 212° F. and atmospheric pressure is introduced into a free board space above the enclosed body of saturated brine at 212° F., the steam will condense into the brine until a condition of equilibrium is reached between the vapor pressure of steam in the combined space and the vapor pressure of the brine solution. When the steam condenses it will dilute the brine by an amount equal to the quantity of steam that condenses and the heat of condensation will be imparted to the brine solution and result in an increase in the temperature thereof. If the experiment is conducted with a slurry of NaCl in such a way that the brine is kept saturated as the steam condenses therein, the temperature of the brine will rise until it reaches 227° F. at which it will boil. Actually the experiment is but one illustration of the well known equation $PV=RT$.

The foregoing principle whereby steam at a given temperature will condense in brine at the same or a higher temperature to result in an increase in temperature of the brine is advantageously utilized, in accordance with the present invention, in connection with heat exchanger tubes or other similar heat transfer surfaces by having a film of saturated or concentrated brine flowing over heat exchanger tubes or surfaces and having steam condense in the film so as to increase the temperature thereof, and result in heat transfer through the tube to a material on the opposite side having a temperature that may be higher than that of the condensing steam.

Accordingly, the object of the present invention generally stated, is to make efficient use in evaporator and other heat transfer systems of the ability of steam at a given temperature and vapor pressure to condense in a film of brine or other electrolyte (preferably concentrated and if possible saturated) flowing over a heat transfer surface so as to raise the temperature of the film and result in heat transfer through the tube or other surface.

A further object of the invention is the use of the phenomenum or principle of vapor pressure reduction of solutions of electrolytes in recompression type evaporating systems so as to reduce the extent to which it is necessary to recompress vapor withdrawn from an evaporator body prior to re-use thereof in a heat exchanger for maintaining the temperature of the liquid undergoing evaporation.

Another object of the invention is the utilization of the phenomenum or principle of lowering of vapor pressure of brine or other electrolyte solutions for improving the efficiency of an evaporator system wherein an economical source of brine, such as impure rock salt or by-product salt, may be utilized as a heat transfer film over the surfaces of the tubes in a heat exchanger forming part of the evaporator system.

Certain other objects of the invention will, in part, be obvious and will in part appear hereinafter.

For a more complete understanding of the nature and scope of the invention, reference may now be had to the following detailed description thereof, taken in connection with the accompanying drawings, wherein:

FIG. 1 is a fragmentary view of a length of heat exchanger tube in connection with which the basic phenomenum or principle underlying the present invention will be described;

FIG. 2 is a diagrammatic view of an experimental apparatus that was used to obtain basic data in connection with the present invention;

FIG. 3 is a diagrammatic view of an evaporator system illustrating one commercial embodiment of the invention;

FIG. 4 is a view illustrating an arrangement for applying films of brine slurries to the upper ends of vertical heat exchanger tubes; and FIG. 5 is a view illustrating an arrangement for applying films of brine slurries to the upper sides of horizontal heat exchanger tubes.

Referring now to FIG. 1, a segment of a heat transfer tube is indicated at 5 which is representative of a heat transfer tube used in a conventional heat exchanger of the tubular type. For example, the tube 5 could be formed of copper or some other metal or alloy having good heat conductance. A stream of liquid (e.g. brine) is shown flowing upwardly through the length of tube 5. The brine could, for example, enter the tube 5 at a temperature of say 214° F. and leave at 219° F. Flowing down the exterior of the tube 5 is a brine film indicated at 7. Optimum results are obtained when the brine film 7 is maintained in the saturated condition by employing a brine slurry so that some salt crystals will remain in the film even with the steam condensing therein. In the event the brine film 7 is not saturated and cannot be maintained in the saturated condition, then the more concentrated the film is the better will be the results obtained.

As applied to the outside of the upper end of the tube 5, the brine film may have a temperature of say 212° F. although this is not critical and, for example, could range from 190° to 300° F. depending upon pressure. The condensing steam surrounding the downwardly flowing brine film 7 is indicated diagrammatically at 8 and it may be at a temperature of 212° F. and at atmospheric pressure. As indicated above, the steam under these conditions will condense in the brine film since the steam has a vapor pressure substantially in excess of the vapor pressure of the saturated brine film and the heat of condensation of the steam will pass into the brine film and thence through the heat exchanger tube 5 so as to increase the temperature of the stream 6 of brine or other liquid flowing upwardly through the tube, even though this stream 6 may already be at a higher temperature than the steam. Under the conditions mentioned the steam at 212° F. can maintain a brine film temperature of 227° F. at 14.7 p.s.i.a. If it were not for the presence of the brine film 7, it will be seen that the steam would have to be compressed to a pressure whereat its temperature would be equal or above the maximum temperature of the liquid 6 flowing through the heat exchanger tube.

The apparatus shown in FIG. 2 of the drawings was set up to obtain useful data on the special heat transfer technique described above in connection with FIG. 1. Referring now to FIG. 2, a single heat exchanger tube 10 is shown extending through vertical column 11 formed of glass. The ends of the column 11 are closed by conical fittings 12 and 13 and there are header plates 14 and 15 at the top and bottom ends respectively, into which the ends of the tube 10 open. At the upper end of the column 11, a plate 16 is inserted below the header plate 14 so as to provide in the space therebetween a chamber 17 into which brine may be introduced at the top of the column 11. The plate is centrally apertured with the diameter of the aperture somewhat exceeding the outer diameter of the tube 10 as to provide an annular space 9 through which the brine can flow over the exterior of the tube 10. The lower conical fitting 13 on the bottom of column 11 is connected with a line 18 through which liquid (e.g. brine) to be heated in the tube 10 may be introduced from a supply tank 19. The line 18 includes a pump 20 having the inlet thereof connected with the tank 19 adjacent the bottom thereof. A rotometer 21 is inserted in the line 18 so as to measure the flow of liquid therethrough.

The outlet of the upper fitting 12 on top of the column 11 is connected by way of a line 22 to a vapor head 23. Condensate drains from the bottom of the vapor head 23 by way of a line 24 into the tank 19. Vacuum is applied to the chamber 23 by way of line 25 leading therefrom and connecting with a surface condenser of known type indicated at 26 having suitable bottom connections for introduction and removal of cooling water and having a side connection 27 communicating with an eductor 28. Condensate from the condenser 26 is removed by a line 30 and introduced into the tank 19 by means of a small pump 31. A pressure gauge 32 is connected to the condenser 26 adjacent the lower end so that pressure at this point may be measured.

A supply of saturated brine is maintained in a supply tank 33 containing undissolved salt, and provision is made for withdrawing this brine from adjacent the bottom thereof by means of a pump 34 and introducing it by way of the line 35 into the brine chamber or header space 17 above the plate 16. A rotometer or other fluid flow measuring device 36 is disposed in the line 35 adjacent the pump 34.

Steam is introduced into the column 11 adjacent the upper end thereof through the line 37, as indicated. Brine drains from around the bottom of the tube 10 through line 29 into the saturator 33.

A series of experiments were run with the apparatus described in connection with FIG. 2 operating under stabilized conditions. In one set of experiments steam only was introduced into the column 11, there being no brine or water introduced into chamber 17 for flowing downwardly over the exterior surface of the heat transfer tube 10. In a second experiment water was introduced into chamber 17 to form a downwardly flowing film over the heat transfer tube 10. In the third experiment saturated brine was introduced into chamber 17 so as to flow downwardly over the heat transfer tube.

Runs were made on two different days and the results of these runs are summarized in Table I below.

TABLE I

[Heating element at approximately atmospheric pressure in all cases]

| Time | 9:30 | 9:50 | 10:30 | 10:45 | 11:20 | 11:35 | 12:10 | 2:20 | 3:55 | 4:05 | 3:40 | 4:20 | 5:30 |
|---|---|---|---|---|---|---|---|---|---|---|---|---|---|
| Abs. Pr., Vap. Hd., inches | 16.15 | 16.15 | 18.1 | 18.1 | 18.03 | 17.93 | 17.73 | 16.02 | 15.90 | 16.0 | 21.3 | 21.3 | 21.3 |
| LM t (log mean temperature difference) | 26.7 | 26.7 | 22.1 | 22.4 | 22.4 | 22.4 | 23.2 | 27.2 | | | 14.3 | 14.3 | |
| Film: | | | | | | | | | | | | | |
| Liq | None | None | None | None | Water | Water | Water | Water | Brine | Brine | None | Water | Brine |
| G.p.m | | | | | 0.41 | 0.36 | 0.43 | 0.41 | 0.60 | 0.53 | | 0.78 | 0.78 |
| Conc. in, percent | | | | | | | | | 28 | 28 | | | 28 |
| Conc. out, percent | | | | | | | | | 21.8 | 21 | | | 23.8 |
| U (overall heat transfer coefficient) | 634 | 630 | 600 | 588 | 510 | 522 | 516 | 626 | 707 | 757 | 615 | 526 | 853 |
| U (basis Δt from brine) | | | | | | | | | 470 | 507 | | | 425 |
| Δt saving, over normal H.E. at 650° F | | | | | | | | | 2.6 | 4.45 | | | *5.3 |

*Δt saving over normal H.E. at 615.

It will be seen from the data obtained in Table I that the coefficient of heat transfer with no liquid film flowing down the heat transfer tube 10 was 615, whereas with a film of plain water flowing down the tube the coefficient of heat transfer was 526. Some reduction in heat transfer was anticipated since the thickness of the water film interferes with the rate of heat transfer. On the other hand, when the film of saturated brine was flowed down over the heat transfer tube 10 the coefficient of heat transfer was 853. Thus, even though the presence of the film of brine would, like the film of water, tend to interfere with the rate of heat transfer, nevertheless the effect of the vapor pressure reduction of the saturated brine solution accounted for the significant increase in coefficient of heat transfer.

The following stabilized conditions were maintained during the foregoing tests using the apparatus of FIG. 2:

Temperature of water introduced into the bottom of the heat transfer tube 10 _____ ° F__ 194
Temperature of water leaving the top of the tube 10 _____ ° F__ 200
Temperature of saturated brine (or water) introduced into chamber 17 _____ ° F__ 219
Concentration of brine leaving the bottom of the column 11 _____ percent__ 23.8
Temperature of the brine in the tank 33 ____ ° F__ 219
Temperature of the water in the tank 19 ____ ° F__ 194

A commercial brine evaporating system making use of the principles of the present invention will now be described in connection with FIG. 3. A typical large evaporator body is indicated at 40 which in operation is filled with brine undergoing evaporation to a level which leaves a freeboard space 41 in the upper portion. The vessel or body 40 has a conical bottom 42 from which depends a solids removal leg 43. A side outlet connection 44 comes off from one side of the conical bottom 42 and leads into a line 45 which connects with the pump 49, and thence to the conical bottom 46 on a tubular type heat exchanger indicated generally at 47. The heat exchanger 47 consists of an outer shell or column 48 with the conical bottom 46 connected to the bottom thereof and a conical top 50 mounted on the top thereof. A conduit 51 leads from the upper conical end 50 of the heat exchanger and connects tangentially with the evaporator body 40 as indicated. Fresh brine to be evaporated is introduced into the system through inlet pipe 52 projecting into the line 51 at the curve therein.

The heat exchanger 47 includes in the shell thereof a jacket 53 into which heating steam may be introduced into the shell 48. The heat exchanger tubes 59 extend between upper and lower header plates, 54 and 55 respectively. Spaced below the upper header plate 54 is a plate 56 which provides a brine chamber 57 into which saturated brine may be introduced through line 58 at the top of the heat exchanger so as to flow downwardly over the exterior of the heat exchanger tubes which are indicated at 59. It will be understood that the plate 56 is provided with tube accommodating apertures of such size as to provide annular brine admitting spaces at the upper end of each tube. The brine which collects in the bottom of the heat exchanger above the bottom header plate 55 is withdrawn through the brine removal line 60 and may be used in forming the supply of saturated brine to the evaporator.

Connected with the closed upper end of the evaporator body 40 is a vapor line 61 which communicates with the inlet connection of a vapor compressor unit 62 the discharge of which is connected by way of line 63 into the steam jacket 53 forming part of the heat exchanger body or shell.

The brine which discharges from the bottom of the heat exchanger 48 through line 60 may be pumped by a pump 64 into a tank 65 containing a slurry of rock salt. Rock salt slurry may be withdrawn from tank 65 through line 66 by a pump 67 and delivered into line 58. Clear brine solution may be withdrawn from tank 65 through line 68 by the pump 70 and delivered into line 52.

The major design features of an installation made in accordance with FIG. 3 which would be capable of producing 100 tons per day of crystalline salt would be as follows:

The evaporator body 40 would have a diameter of 11 feet, the main cylindrical portion a height of 15 feet, the conical portion 42 a height of 8.1 feet and the product removal leg 43 a height of 10.0 feet and a diameter of 1.67 feet. The heat exchanger tubes 47 would have an over-all height of 20 feet and would contain 440 heat exchanger tubes formed of copper each having a diameter of 1¼ inches and a length of 20 feet. The pump 49 in line 45 would have sufficient capacity to withdraw brine through the line 45 and deliver it into the bottom end of the heat exchanger 47 at the rate of 7000 gallons per minute. The compressor unit 62 would be capable of handling or compressing 14,100 cubic feet of steam or vapor from a pressure of 10.83 pounds per square inch up to a pressure of 14.7 pounds per square inch absolute.

In a typical operation the brine in the main body of the evaporator 40 would have a temperature of approximately 212° F. and a concentration of approximately 26%. Brine would be withdrawn through the line 45 and recirculated through the heat exchanger 47 at the rate of 7000 gallons per minute with the brine being introduced into the bottom of the heat exchanger at a temperature of approximately 212° F. and leaving the heat exchanger at the top cone 50 of a temperature of approximately 219° F.

Fresh feed brine would be inroduced through the line 52 at a concentration of 26% and at the rate of 55 gallons per minute.

The steam or vapor in the freeboard space 41 would be at a temperature of 197° F. and at a pressure of 10.83 pounds per square inch absolute. This vapor would be withdrawn at the rate of 395 pounds per minute through the line 61 and recompressed in the compressor 62 to a temperature of approximately 212° F. and pressure of 0 p.s.i.g., at which it would be introduced into the jacket 53 of the heat exchanger 47.

A slurry of brine (3.15% NaCl concentration) would be introduced into chamber 57 at a temperature of 227° F. and at the rate of 450 gallons per minute. This brine and the condensate formed in the heat exchanger 47 would be withdrawn through the line 60 at a concentration of about 26% and at a temperature of 227° F. and at the rate of 490 gallons per minute.

Improved results are obtained when the saturated brine introduced at the top of the heat exchanger 47 is not only saturated but contains sufficient undissolved salt crystals so that the brine remains at least substantially saturated all the way to the bottom of the heat exchanger to the point where it is withdrawn through the line 60. In this way maximum advantage is taken of the boiling point elevation obtainable with saturated brine.

The installation described in FIG. 3 has useful application where there is a need to produce pure or substantially pure salt and where impure salt is available at low cost. For example, large quantities of rock salt and solar and by-product salt are annually hauled into many metropolitan areas in the northern portions of the hemisphere so as to be available for highway ice melting during the winter months. The quantities of rock salt so used are very large so that this material is now readily available in a number of locations in the northern part of the country at a very favorable cost. Such impure salts could be used in the system described in connection with FIG. 3 both for producing saturated brine for filming down over the heat exchanger tubes in the heat exchanger 47 and also to be dissolved and evaporated in the evaporator body 40 so as to produce substantially pure salt which is removed through the product leg 43.

Of course, a system such as FIG. 3 could also be used economically right at a rock salt mine itself.

There are also certain process industries wherein waste salt fines, crude salt, or slurries thereof, are available as waste products. For example, in certain potash producing installations large quantities of sodium chloride slurries are formed and discharged to waste since these operations are carried out in remote areas where there is no market for the salt. Such slurries could be used to feed an installation in accordance with FIG. 3.

Several modifications may be made in the system described above in connection with FIG. 3. Thus, instead of having an apertured plate 56 so as to provide a brine chamber 57 it is possible to distribute saturated brine, or a brine slurry containing finely divided particles of salt over the upper ends of the vertical heat exchanger tubes 72 (FIG. 4) by means of horizontal distributor pipes 73—73. These pipes receive the brine from a header pipe or conduit 74. The pipes 73 are provided with side openings for spraying or discharging streams of the brine slurry in opposite directions over the sides of the upper ends of the heat exchanger tubes 72. It will be understood that there may be as many of the horizontal distributor pipes 73 as desired.

In the event a heat exchanger is used that has horizontal heat exchanger tubes, a system for distributing brine slurry may be used such as shown in FIG. 5. In this arrangement there is a plurality of horizontal brine slurry distributing pipes 75 which have downwardly discharging nozzles which discharge through apertures in a horizontal distributing plate 76 in the upper portion of the shell 77. The sprays pass over the heat exchanger tubes 78—78 which are preferably arranged in regular rows as indicated.

Certain other changes will be apparent to those skilled in the art and may be made without departing from the

I claim:

1. In the process of evaporating a body of aqueous liquid maintained in a closed vessel and wherein said body is at least in part heated by circulating at least a portion thereof through a tubular heat exchanger, the improvement which comprises withdrawing vapor from said closed vessel, compressing said vapor, and introducing the compressed vapor into said heat exchanger on the heat input side thereof while flowing saturated films of electrolyte solution over the heat input surfaces of the tubes in said heat exchanger, said vapor being compressed to a pressure exceeding the maximum vapor pressure of said films of electrolyte solution and to a temperature less than the maximum temperature of said films whereby said compressed vapor condenses in said films and maintains the temperature thereof.

2. The improvement of claim 1 wherein the temperature of said compressed vapor introduced into said heat exchanger is less than the temperature to which the aqueous liquid is heated in passing through said heat exchanger.

3. The improvement of claim 1 wherein said body of aqueous liquid contains the same electrolyte as that in said films.

4. The improvement of claim 1 wherein said films of electrolyte solution contain undissolved electrolyte so as to maintain the saturation thereof.

5. In the process of evaporating a body of sodium chloride brine maintained in a closed evaporator vessel and wherein said body is at least in part heated by circulating a portion thereof through a tubular heat exchanger, the improvement comprising withdrawing vapor from said vessel, compressing the vapor, and introducing said compressed vapor into said heat exchanger on the heat input side thereof while flowing saturated films of sodium chlorides brine over heat input surfaces of the heat exchanger tubes, said vapor being compressed to a pressure exceeding the maximum vapor pressure of said brine films and to a temperature less than the maximum saturated temperature of said films whereby said compressed vapor condenses in said films and maintains the temperature thereof.

6. The improvement of claim 5 wherein the temperature of said compressed vapor introduced into said heat exchanger is less than the temperature to which brine from said body of brine is heated in circulating through the external side of said heat exchanger.

7. The improvement in claim 5 wherein said films of brine contain undissolved salt to maintain the saturation thereof.

References Cited

UNITED STATES PATENTS

| | | | |
|---|---|---|---|
| 440,231 | 11/1890 | Lillie | 159—13 |
| 1,481,723 | 1/1924 | Merz | 159—10 |
| 1,536,894 | 5/1925 | Lillie | 159—13 |
| 2,295,088 | 9/1942 | Kleucker | 159—13 |
| 2,775,097 | 12/1956 | Berestneff | 62—485 X |
| 2,795,115 | 6/1957 | Kumm | 62—485 X |
| 3,190,817 | 6/1965 | Neugebauer et al. | 159—13 X |
| 3,203,875 | 8/1965 | Sturtevant | 62—485 X |

FOREIGN PATENTS

| | | |
|---|---|---|
| 152,753 | 10/1920 | Great Britain. |

NORMAN YUDKOFF, *Primary Examiner.*

WILBUR L. BASCOMB, JR., *Examiner.*

J. SOFER, *Assistant Examiner.*

UNITED STATES PATENT OFFICE
CERTIFICATE OF CORRECTION

Patent No. 3,362,458                  January 9, 1968

Cecil M. Hopper

It is certified that error appears in the above identified patent and that said Letters Patent are hereby corrected as shown below:

Column 1, line 17, for "unsaturated" read -- saturated --; column 5, line 71, for "inroduced" read - introduced --

Signed and sealed this 15th day of July 1969.

(SEAL)
Attest:

Edward M. Fletcher, Jr.            WILLIAM E. SCHUYLER, JR.
Attesting Officer                     Commissioner of Patents